(12) United States Patent
Barnett et al.

(10) Patent No.: US 6,968,056 B2
(45) Date of Patent: Nov. 22, 2005

(54) MOBILE PHONE WITH ELASTIC HINGE

(75) Inventors: Ricky William Barnett, Tokyo (JP); Simon Wilson, Reading (GB)

(73) Assignee: Nokia Corporation, Espoo (FI)

( * ) Notice: Subject to any disclaimer, the term of this patent is extended or adjusted under 35 U.S.C. 154(b) by 363 days.

(21) Appl. No.: 10/027,875

(22) Filed: Dec. 21, 2001

(65) Prior Publication Data
US 2003/0118179 A1 Jun. 26, 2003

(51) Int. Cl.[7] .......................... H04M 1/00; H04B 1/38
(52) U.S. Cl. ..................... 379/433.13; 455/575.3
(58) Field of Search ..................... 379/433.13; 16/225; 439/165; 455/575.3

(56) References Cited

U.S. PATENT DOCUMENTS

| | | | |
|---|---|---|---|
| 4,403,712 A | * | 9/1983 | Wiesinger ................ 16/225 |
| 5,905,796 A | | 5/1999 | Jung |
| 5,915,440 A | | 6/1999 | Repo |
| 6,091,938 A | | 7/2000 | Go |
| 6,125,289 A | | 9/2000 | Lee |
| 6,148,480 A | | 11/2000 | Cooke |
| 6,292,563 B1 | | 9/2001 | Clark et al. |
| 6,292,980 B1 | | 9/2001 | Yi et al. |
| 6,547,575 B2 | * | 4/2003 | Kato et al. ................ 439/165 |

* cited by examiner

*Primary Examiner*—Jack Chiang
(74) *Attorney, Agent, or Firm*—Cohen, Pontani, Lieberman & Pavane

(57) ABSTRACT

A foldable mobile phone hardset includes a first part and a second part which are pivotably connected by an elastic sheet. The sheet has a first end fixed in a curved slot in the first part and a second end fixed in a curved slot in the second part. The curvature of the sheet adds to the spring loading of the parts toward a stable open position of the phone, wherein the sheet has a uniform curvature along its length. The electronic components of the two parts are connected by an electronic element which is laid against the elastic sheet, the electronic element and the sheet being encased in an elastomeric sheath.

16 Claims, 2 Drawing Sheets

MOBILE PHONE WITH ELASTIC HINGE

BACKGROUND OF THE INVENTION

1. Field of the Invention

The invention relates to a foldable apparatus comprising first and second parts connected by a hinge, in particular a hand held device such as a mobile phone handset.

2. Description of the Related Art

Mobile phone handsets have several basic configurations. One has a flip down portion which contains only a microphone and is therefore of light construction and requires only a simple hinge mechanism. See, for example, U.S. Pat. No. 6,292,563. However the phone body may also be configured as two parts of substantially equal size, both containing significant parts of the phone. For these phones a more substantial hinge is needed. In particular, the hinge should have a stable open position which can withstand some overstress beyond the stable position.

Known mobile phones typically have mechanical hinges with cylindrical components, and wiring which must be routed around the hinges. U.S. Pat. No. 6,148,480 discloses a hinge construction which is suitable for a handset having substantially equal sized body parts and is also bistable, i.e. gives a snap-open, snap-shut feel. The body parts are molded with barrels having a coaxial bore which receives numerous components including cams and springs which provide the desired action. This complexity adds to the cost of the handset.

SUMMARY OF THE INVENTION

It is an object of the invention, to provide a compact hinge construction for a hand held device such as a mobile phone, which is inexpensive to manufacture and assemble.

It is also an object, to provide a hinge construction wherein the phone parts are loaded away from each other, i.e. away from a closed position of the phone, yet require little latching force to hold the phone in the closed position.

It is a further object, to provide a hinge construction which provides a stable open position wherein the two parts of the handset assume a desired orientation, but can still withstand overstress, i.e. travel beyond a predetermined angle relative to each other.

These and other objects are achieved by a hinge formed as an elastic sheet having a first end fixed to the first part and a second end fixed to the second part. The sheet is foldable transversely of its longitudinal axis so that the first part is pivotable with respect to the second part, and, when folded, loads the first part away from the second part toward a longitudinally unloaded position of the sheet. The sheet is preferably curved at its ends, which are received in likewise curved slots of the first and second parts, the slots being formed between molded halves of the respective phone parts so that the sheet ends are sandwiched between the halves. The curvature of the sheet adds to the spring loading toward a stable open position of the phone, wherein the sheet has a uniform curvature throughout its length.

The electronic components of the two parts of the handheld device are electrically connected by one or more elements which are laid against the elastic sheet, the electrical connection elements and the elastic sheet being encased in an elastomeric sheath. A flat printed circuit (FPC) and/or a coaxial RF cable may be used as the connection elements.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the drawings, wherein like reference numerals delineate similar elements throughout the several views.

DETAILED DESCRIPTION OF THE PRESENTLY PREFERRED EMBODIMENTS

Figure 1:
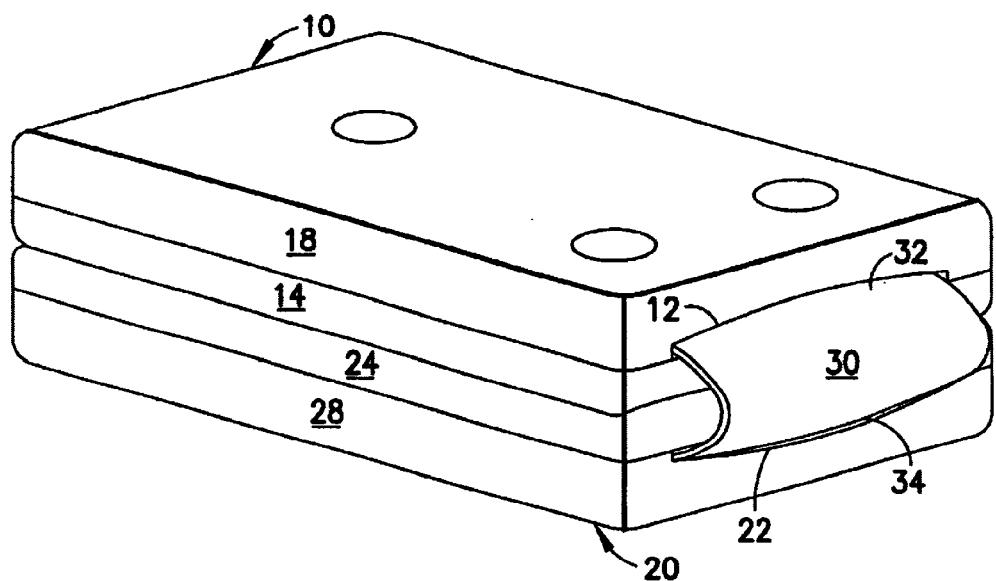
FIG. 1 is a schematic perspective of a two part hand held device according to the invention in the closed position.

Referring to FIG. 1, the folding hand held device according to the invention includes a first body part 10 which is hinged to a second body part 20 by a sheathed elastic sheet 30. The sheet 30 has opposed first and second ends 32, 34 which are received in curved slots 12, 22 in respective first and second body parts 10, 20. The first part 10 includes an inside half 14 and an outside half 18 having a central plane therebetween, the first end 32 being sandwiched in a slot 12 formed between the halves 14, 18 at an angle to the central plane. Likewise, the second part 20 includes an inside half 24 and an outside half 28 having a central plane therebetween, the second end 34 being sandwiched in a slot 22 formed between the halves 24, 28 at an angle to the central plane. The halves 14, 18 and 24, 28 may be provided internally with cooperating pegs and holes or other means for positively retaining the ends of the elastic sheet in the first and second parts without the need for glue, screws, or other additional retaining means. The body parts 10, 20 have approximately the same dimensions.

Figure 2:
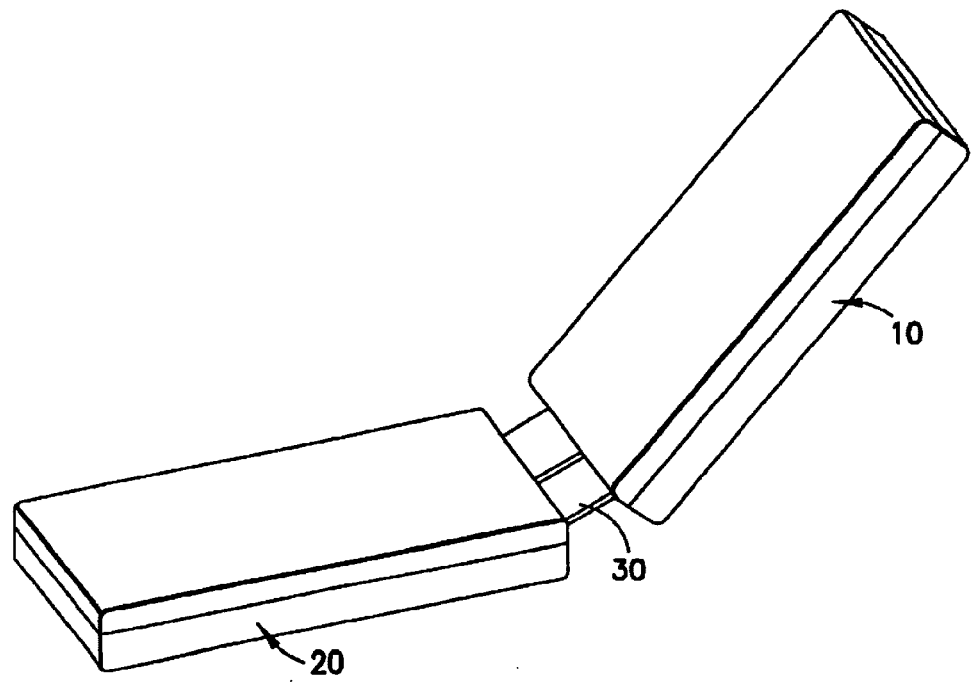
FIG. 2 is a schematic perspective of the hand held device of FIG. 1 in the open position.
Figure 3:
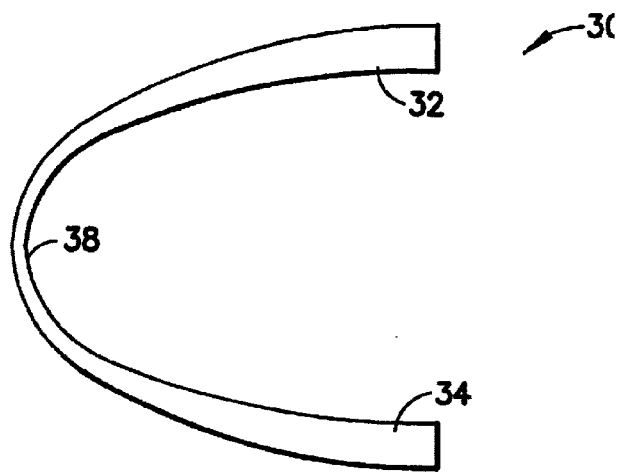
FIG. 3 is a side view of the sheet spring in the folded position.

FIG. 2 depicts the hand held device in the open position, wherein the two halves 10, 20 have assumed a relatively stable position relative to each other, with their central planes at an angle of about 120 to 150 degrees. The open position is rendered stable by virtue of the curvature of the elastic sheet 30 being uniform from the first end 32 to second end 34. As shown in FIG. 3, when the hand held device is in the closed position of FIG. 1, the elastic sheet 30 is folded along a line 38 transverse to the longitudinal axis of the sheet extending between first and second ends 32, 34. Since the tendency of the sheet is to straighten out so that the ends are substantially at 180 degrees to each other and the curvature is uniform along its length, the sheet 30 urges the two parts 10, 20 toward the open position. Since the closed position is not stable, a latch (not shown) is provided for latching the parts together in the closed position.

Figure 4:
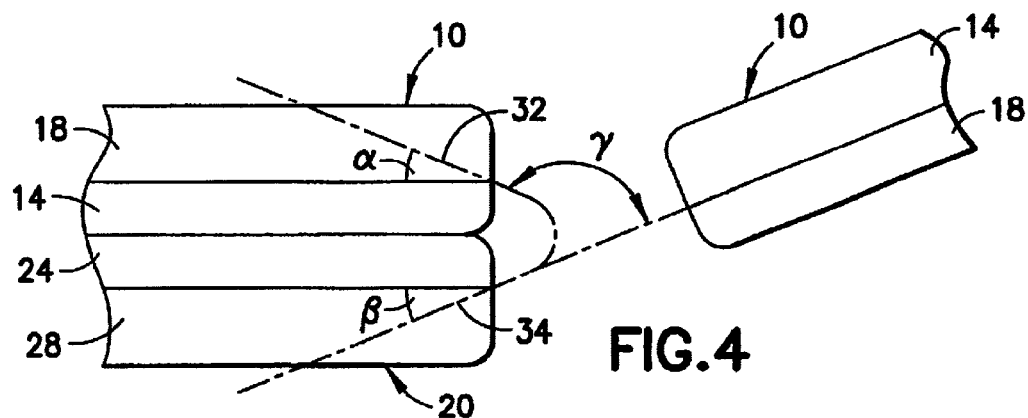
FIG. 4 is a schematic partial cross-section of the hand held device in the closed position, with the open position shown in phantom.

The angle between the two halves 10, 20 in the open or stable position of FIG. 2 is determined by the angles at which the slots 12, 22, and thus the first and second ends 32, 34, extend into the respective parts 10, 20. FIG. 4 is a cross section taken along the longitudinal axis of the elastic sheet 30 showing the angles and between the ends 32, 34 and the respective central planes of the parts 10, 20. When the sheet is opened to about 180 degrees, the angle between the central planes will be 180—. Where the angles and are about thirty degrees, for example, the central planes will be oriented at about 120 degrees when the parts 10, 20 are in the stable open position, as shown in phantom.

Figure 5:
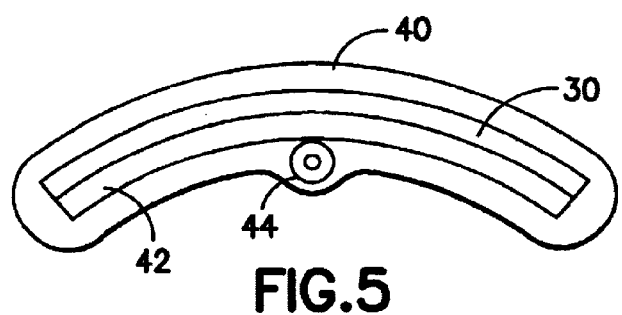
FIG. 5 is a cross-section of the sheet spring and electrical connections in an elastomeric sheath.

FIG. 5 is a cross section of the elastic sheet 30 encased in an elastomeric sheath 40 in parallel with an FPC (flat printed circuit) 42 and an RF coaxial cable 44 (also visible in FIG. 2). The elastic sheet 30 is preferably formed of a plastic or metal having good spring properties and resistance to strain over many thousands of folding operations. In a preferred embodiment, the sheet is made of spring steel and is about 0.15 mm thick, about 3 cm wide, and is prestressed to have a curvature across its width with a radius of about 20 cm. The curvature imparts an additional restoring or spring force to the elastic sheet which makes it possible to keep the thickness to a minimum. A relatively thin sheet reduces internal stresses in the sheet, as well as relative sliding movement between the FPC, the RF cable, and the elastic sheet. The elastomeric sheath is preferably engineering plastic, and should also permit some relative movement of the encased parts.

The hinge of the present invention may be used with any hand held device which has two pivotably connected parts, such as a mobile phone, a personal digital assistant, a laptop computer, a CD player, and a DVD player. For added strength, more than one elastic sheet hinge can be provided, e.g. with a laptop computer.

The elastic sheet can assume any desired preselected unstressed angle along its length or width by forming the elastic sheet in its unstressed orientation having that desired preselected unstressed angle. If the elastic sheet is heat deformable, this can be accomplished by holding the sheet in the desired angular orientation, heating the sheet to the plastic deformation temperature, then allowing the sheet to cool in this orientation.

The elastic sheet may be a single sheet of elastic material or a plurality of sheets sandwiched together. By employing several sheets, the electrical connection between the first and second parts of the hand held device may within a layer or a channel formed in a layer.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A foldable electronic apparatus comprising
a first part of the electronic apparatus;
a second part of the electronic apparatus, each of the first and second parts having a central plane; and
an elastic sheet having a first end fixed to said first part, a second end fixed to said second part, and a longitudinal axis extending from said first end to said second end, said elastic sheet being foldable transversely of said longitudinal axis so that said first part is pivotable with respect to said second part from a closed position to an open position, said central planes of said first and second part being approximately parallel and said elastic sheet being folded transversely of said centerline in said closed position, said elastic sheet, when folded transversely of said centerline, loading said first part away from said second part toward a longitudinally unloaded position of said sheet, said open position of said first and second parts corresponding approximately to said longitudinally unloaded position of said elastic sheet, wherein a transverse section of said elastic sheet proximate at least one of said first and second ends of said elastic sheet is curved for stabilizing said longitudinally unloaded position, wherein a center of curvature of said transverse section of said elastic sheet is approximately normal to said longitudinal axis.

2. The foldable electronic apparatus of claim 1, wherein at least one of said first and second parts comprises a curved slot which receives said at least one of said first and second ends.

3. The foldable electronic apparatus of claim 1, wherein said sheet is curved transversely of said centerline at both of said ends.

4. The foldable electronic apparatus of claim 3, wherein, when said sheet is in said longitudinally unloaded position, said sheet is curved transversely of said axis from said first end to said second end.

5. The foldable electronic apparatus of claim 4, wherein each of said first and second parts comprises a curved slot which receives a respective one of said first and second ends.

6. The foldable electronic apparatus of claim 4, wherein, when said sheet is in said longitudinally unloaded position, said sheet has a uniform curvature from said first end to said second end.

7. The foldable electronic apparatus of claim 1, wherein said first and second ends being fixed in respective said first and second parts with said central planes at respective first and second angles to said centerline, said angles being determinative of the angle between the central planes when said sheet is in said longitudinally unloaded position.

8. The foldable electronic apparatus of claim 7, wherein, in said longitudinally unloaded position, said first end is oriented about 180 degrees from said second end, whereby said central planes are at an angle of about 180 degrees less said first and second angles.

9. The foldable electronic apparatus of claim 7, wherein said first angle is substantially equal to said second angle.

10. The foldable electronic apparatus of claim 7, wherein each of said first and second angles is between about 15 and about 30 degrees.

11. The foldable electronic apparatus of claim 1, further comprising a flexible printed circuit element extending from said first part to said second part adjacent to said elastic sheet.

12. The foldable electronic apparatus of claim 1, further comprising an elastomeric sheath on said elastic sheet.

13. The folding electronic apparatus of claim 1, wherein said apparatus is a mobile telephone.

14. The folding electronic apparatus of claim 1, wherein said elastic sheet comprises at least two layers with an electrical connection between said first and second parts between said layers.

15. The folding electronic apparatus of claim 1, wherein, in said longitudinally unloaded position, said first end is oriented less than 180 degrees from said second end.

16. The folding electronic apparatus of claim 11, wherein said elastic sheet and said flexible printed circuit element form a laminate, said electronic apparatus further comprising an elastomeric sheath on said laminate.

* * * * *